(12) United States Patent
Stumpe

(10) Patent No.: US 6,188,485 B1
(45) Date of Patent: Feb. 13, 2001

(54) DISK-MOUNT DEVICE FOR AUTOMATIC SUCCESSIVE TESTING OF COMPUTER-DRIVE DISK BLANKS BY INTERFEROMETRY

(75) Inventor: Kenneth Stumpe, Tucson, AZ (US)

(73) Assignee: Veeco Corporation, Tucson, AZ (US)

( * ) Notice: Under 35 U.S.C. 154(b), the term of this patent shall be extended for 0 days.

(21) Appl. No.: 09/291,521

(22) Filed: Apr. 14, 1999

(51) Int. Cl.[7] .............................. G01B 9/02; G01B 11/00
(52) U.S. Cl. ..................... 356/511; 356/244; 356/450
(58) Field of Search ................................. 356/359, 345, 356/244

(56) References Cited

U.S. PATENT DOCUMENTS 5,689,337   11/1997   Lamb, Jr.et al. ..................... 356/359
5,986,753 * 11/1999   Seelig et al. ........................ 356/244

* cited by examiner

Primary Examiner—Robert Kim
Assistant Examiner—Phil Natividad

(74) Attorney, Agent, or Firm—Antonio R. Durando

(57) ABSTRACT

A substantially vertical sample stage for interferometric testing of computer-drive disks is positioned along an inclined trackway. The stage includes three pressure tips that provide a fixed, aligned plane against which the back surface of the disk being tested is positioned in optical alignment with the reference surface of the instrument. The degree of protrusion of two of the pressure tips can be adjusted to set the proper tip/tilt of the disk. Each disk being tested is allowed to roll down the trackway by gravity to a rubber stop in front of the stage. The trackway is also tilted slightly to cause the disk to roll on edge and lean against the sidewall of the trackway. After the disk is stopped in front of the stage, a retractable finger engages the forward edge of the disk and produces a slight backward motion to release the disk from the rubber stop and align it with the stage. An air-stream burst is then applied to the back surface of the disk to create a suction that attracts the disk to the three pressure tips while supported by two edge points in contact with the retractable finger and the inclined trackway. Interferometric testing is carried out and, finally, the finger is retracted and the disk allowed to roll down the inclined trackway away from the stage while another disk is rolled into position for testing.

20 Claims, 9 Drawing Sheets

DISK-MOUNT DEVICE FOR AUTOMATIC SUCCESSIVE TESTING OF COMPUTER-DRIVE DISK BLANKS BY INTERFEROMETRY

BACKGROUND OF THE INVENTION

1. Field of the Invention

This invention pertains to the general field of interferometry and apparatus for testing surfaces. In particular, it provides a novel disk-mount device for successively and automatically testing computer-drive disk blanks for quality control purposes in an assembly line.

2. Description of the Prior Art

As computer equipment becomes smaller and subject to wear and tear associated with portability, the precise flatness of drive disks becomes more and more critical to high-speed performance and reliability. Moreover, any scratch or other imperfection on the surface of a disk is cause for discarding it during manufacture. Thus, conventional aluminum disks are increasingly being replaced by glass disks, which are lighter and less subject to warpage and, therefore, preferable for most applications. The flatness of both kinds of disks is typically tested for quality control by interferometric measurements that identify damaged or substandard areas on either of the two parallel surfaces of a disk. For complete quality control, the flatness of one surface of the disk is first measured on an instrument such as a Fizeau interferometer and the disk is then flipped over to test the opposite surface. During high-volume manufacture, though, disk blanks are processed at a rate of many thousands per hour; therefore, tests are often performed on a limited number of samples from each batch and only on one side of the disk. For example, current disk production needs require the ability to test about 3,600 blanks per hour.

As well known in the art, the surface geometry of an aluminum or glass computer-drive disk can be measured with a Fizeau-type interferometer with reference to a flat reference surface (known in the art as a transmission flat). As illustrated in schematic representation in FIG. 1, the interferometric device 30 comprises a light source 10 (normally a laser operating in the single mode) producing a beam of light 12 that is passed through a microscope objective 14 and a spatial filter 16, such as a pinhole. The light 12 is then collimated by a very-well corrected collimating objective 18 and directed through a transmission flat 20 (comprising the reference surface 21) toward the test surface 23 (consisting of one side of a computer-drive disk 22) positioned collinearly (with respect to the light beam) and substantially in parallel to the reference surface at some distance within the coherence length of the light source 10. The light reflected by the test surface 23 interferes with the light reflected at the reference surface 21 and, according to the principle of superposition, bright interference fringes are produced corresponding to all points on the reference surface where the optical path difference (OPD) of the light is equal to a multiple of its wavelength. A beam splitter 24 is placed between the spatial filter 16 and the collimating objective 18 in order to reflect the fringes to the side, so that they may be observed on a screen or directed to a camera 26 through appropriate lenses 28 for display, and/or to other instrumentation for recording and data processing. The interference fringes so produced are used to provide a measure of the flatness of the tested disk surface.

Prior-art equipment for testing disk blanks utilizes mounting devices that permit the placement of the disk 22 on a sample stage in a desired predetermined spatial relation with respect to the transmission flat 20. It is essential that the disk surface mounted on the stage be positioned as desired and then held still for interferometric measurements. It is also essential that each successive disk placed on the mount device be fixed in the same exact position. Appropriate mechanisms for adjusting the tip and tilt of the disk surface are also provided, as well known in the art, operating on the back surface of the disk, rather than directly on the test surface.

Pressure applied by the mounting mechanism may cause disk deformation, which in turn results in misalignment with respect to the reference surface. In addition, vibrations in the disk mount can cause measurement errors. Accordingly, these devices are not very stable while performing repeated measurements. U.S. Pat. No. 5,689,337, herein incorporated by reference, discloses a self-aligning disk mount consisting of a hub capable of retaining a disk in precise alignment with the transmission flat by hanging its center hole on two support posts and resting the disk on three pressure tips on the hub. A system of push-pull adjustment screws is provided to set the proper tip/tilt of the disk. The plane established by the three pressure tips provides a fixed, aligned plane against which the test surface of successive disks is directly positioned in alignment with the reference surface. By utilizing gravity to position the disk against the three pressure tips in substantially vertical disposition, deformation of the disk is minimized.

All prior-art testing equipment is designed for manual feed of disk blanks and is not suitable for high-volume on-line testing. Even devices that ensure the alignment of successive disks placed in test position, such as the apparatus described in the '337 patent, require that each disk be handled in and out of the retaining structure that holds the disk in place during the test procedure. This requirement slows the operation down and renders current equipment unsuitable for automatic, high-speed testing. Therefore, there is still a need for a more versatile solution.

BRIEF SUMMARY OF THE INVENTION

It is therefore an objective of this invention to provide a mounting mechanism that is more suitable than prior-art devices for automated, high-speed positioning of computer-drive disk blanks in alignment with interferometric test apparatus.

Another objective of the invention is an automatic mounting mechanism capable of sequentially processing disks at a rate of one every few seconds.

Another goal of the invention is a test-mount mechanism that does not require manipulation of the disks by solid mechanical means that may damage a disk surface during testing.

A further objective of the invention is a mounting mechanism that minimizes manipulation of the test disk by extraneous handling equipment.

Still another objective is a mechanism that is suitable for incorporation with existing interferometric instruments.

Finally, another goal is the implementation of the above mentioned objectives in a commercially viable system that maximizes the utilization of existing technology.

In accordance with these and other objectives, the preferred embodiment of the invention consists of a substantially vertical sample stage positioned along an inclined disk trackway. The stage includes three pressure tips that provide a fixed, aligned plane against which the back surface of the disk being tested is positioned in optical alignment with the reference surface of the instrument. The degree of protrusion of two of the pressure tips can be adjusted to set the proper tip/tilt of the disk. Each disk being tested is allowed to roll down the trackway by gravity to a rubber stop in front of the stage. The trackway is also tilted slightly to cause the disk to roll on edge and lean against the sidewall of the trackway. After the disk is stopped in front of the stage, a retractable finger engages the forward edge of the disk and produces a slight backward motion to release the disk from the rubber stop and align it with the stage. An air-stream burst is then applied to the back surface of the disk to create a suction that attracts the disk to the three pressure tips while supported by two edge points in contact with the retractable finger and the inclined trackway. Interferometric testing is carried out and, finally, the finger is retracted and the disk allowed to roll down the inclined trackway away from the stage while another disk is rolled into position for testing.

According to another aspect of the invention, multiple trackways and sample stages are operated in parallel to increase testing capacity on a production line. In the preferred embodiment, four trackways deliver disks to four separate test stages. Images from two stages at a time are combined via split mirrors and processes simultaneously. Moreover, each pair of images is alternately switched in and out of the interferometric optical path using a moving mirror. Thus, four disks are tested in very short sequence by multiplexing a single light source and a single camera.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE INVENTION

The heart of this invention lies in the idea of combining an inclined trackway with an intermittent air stream to place a disk in testing position for successive interferometric measurements. As a result, the disk is aligned against appropriate reference points without any manipulation by mechanical devices other than the air flow. Thus, the probability of causing damage to the disk during testing is greatly reduced.

Figure 1:
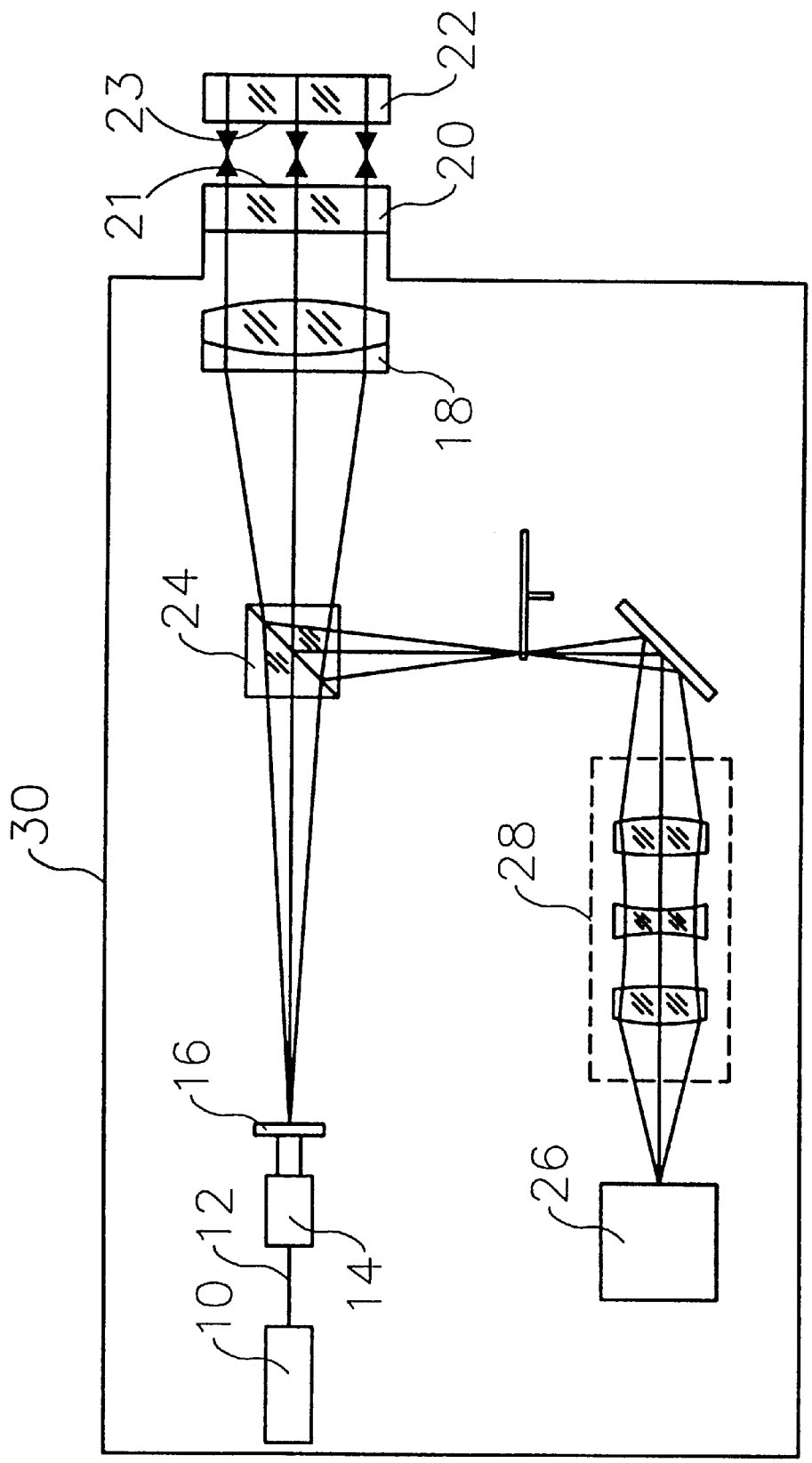
FIG. 1 is a schematic representation of a Fizeau interferometer including a separate mounting mechanism for a test surface according to the prior art.
Figure 2:
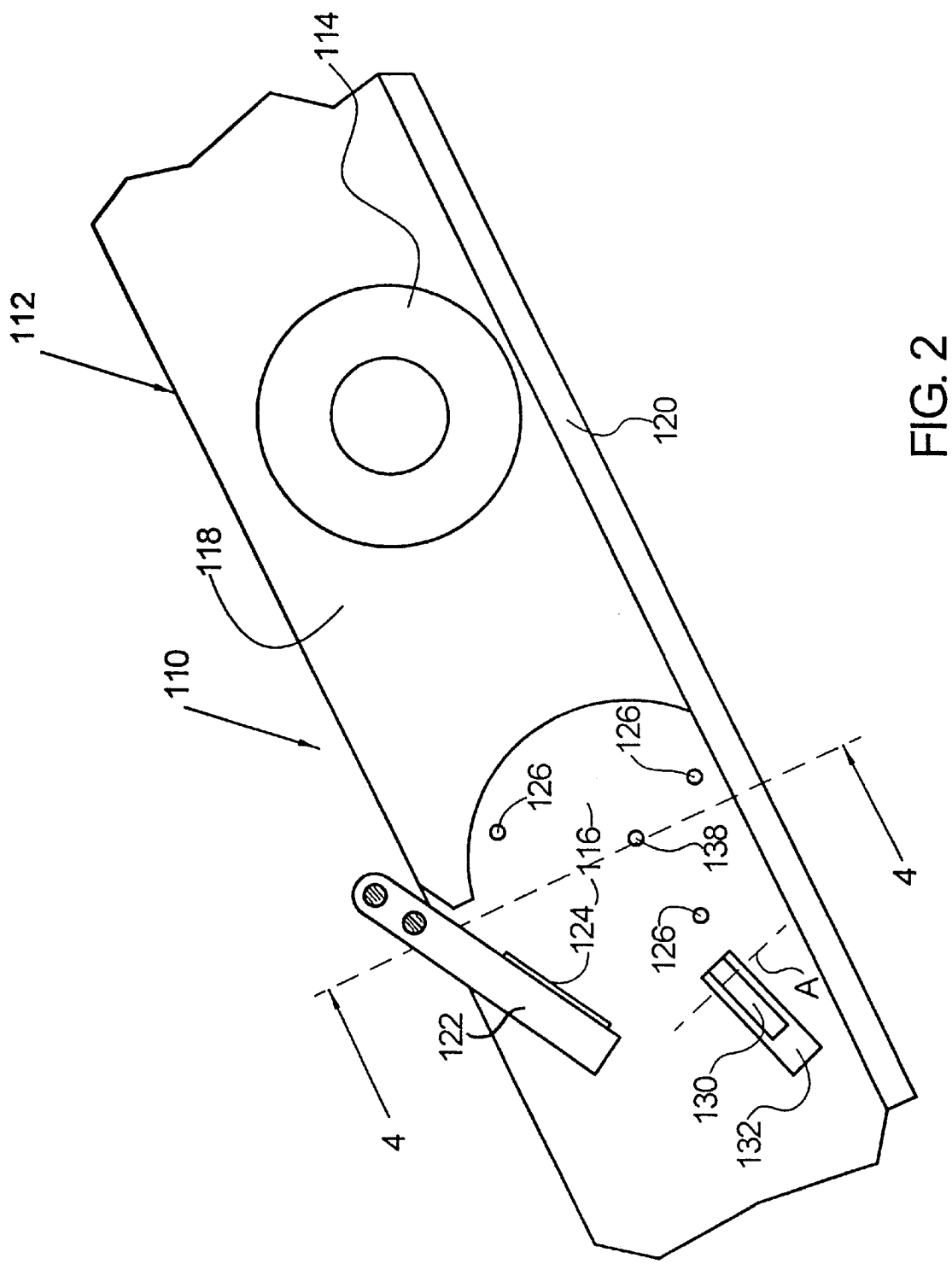
FIG. 2 is a schematic representation in side view of a disk-mounting mechanism for interferometric testing according to the invention showing a disk rolling down the trackway toward the sample stage region.
Figure 3:
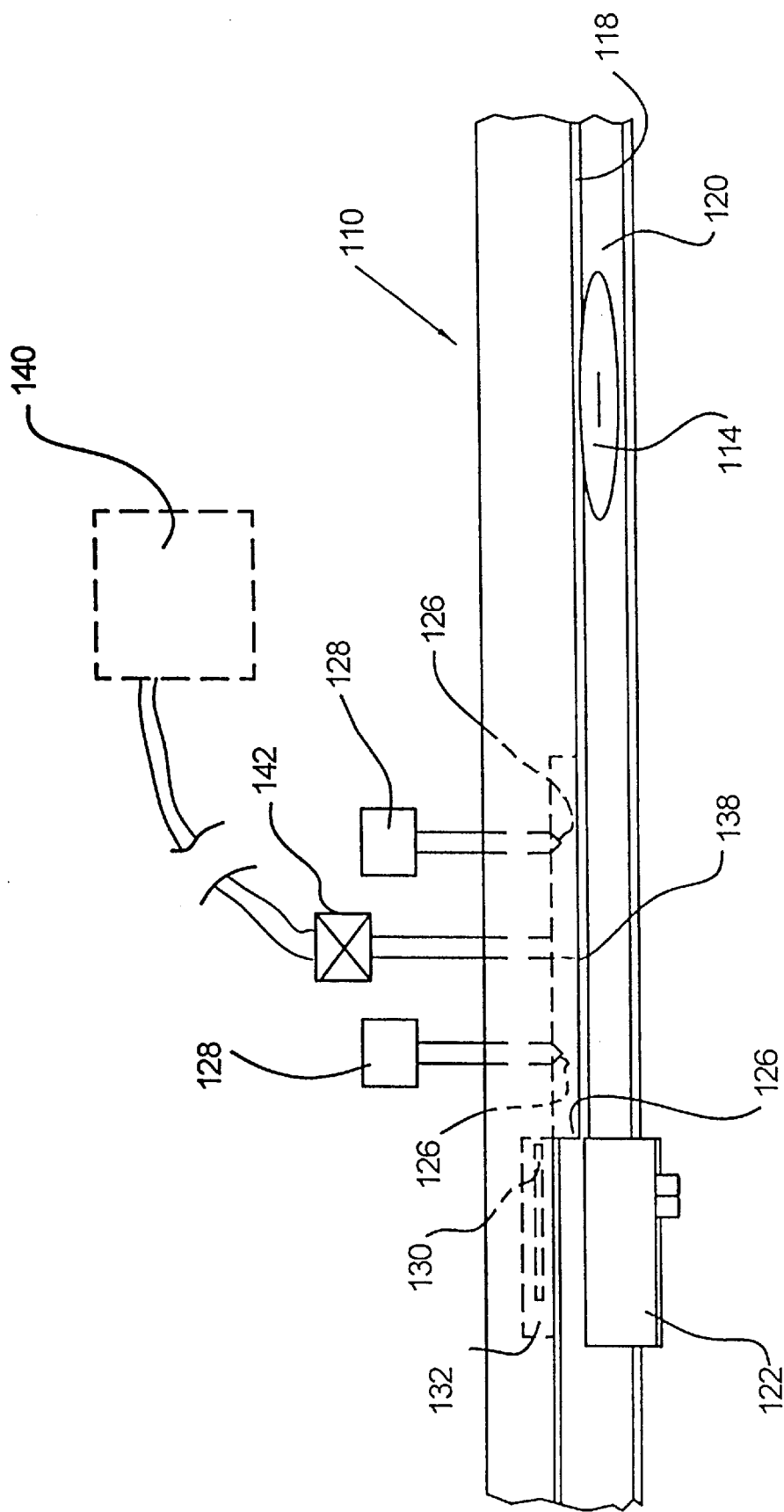
FIG. 3 is a schematic top view of the disk-mounting mechanism shown in FIG. 2.
Figure 4:
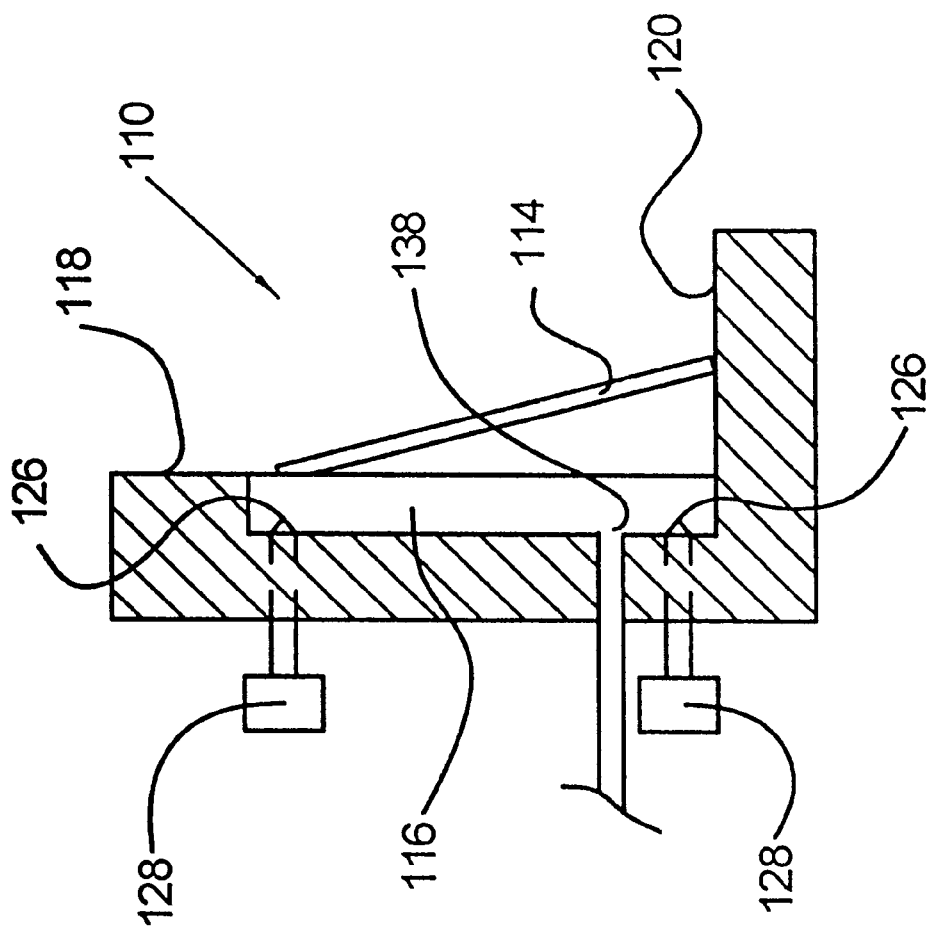
FIG. 4 is a partial cross-sectional front view of the disk-mounting mechanism of FIG. 2 as seen from line 4—4 in that figure, wherein the stopper is not shown for simplicity.

Referring to the drawings, wherein like parts are designated throughout with like numerals and symbols, FIG. 2 is a schematic representation in side view of a disk-mounting mechanism 110 for interferometric testing according to the present invention. FIGS. 3 and 4 are corresponding top and front views, respectively. The mechanism 110 includes an inclined trackway 112 for feeding computer-drive disks 114 rolling by gravity toward a testing stage 116. The trackway 112 includes a sidewall or shoulder 118 and a base or track 120 along which the disks 114 roll toward the stage 116. As illustrated in FIGS. 3 and 4, the shoulder 118 is tilted inward to cause the disks to lean on it while rolling down the track 120. The trackway is also preferably lined with ultrahigh molecular weight (UHMW) polyethylene or equivalent material to minimize friction and abrasion on the disks. Moreover, the rolling disks create an air-bearing film between their back surface and the shoulder 118 which facilitates motion and protects the disks from damage. In the preferred embodiment of the invention, the trackway 112 is inclined about 30 degrees and the shoulder 118 is tilted about 5 degrees.

Figure 5:
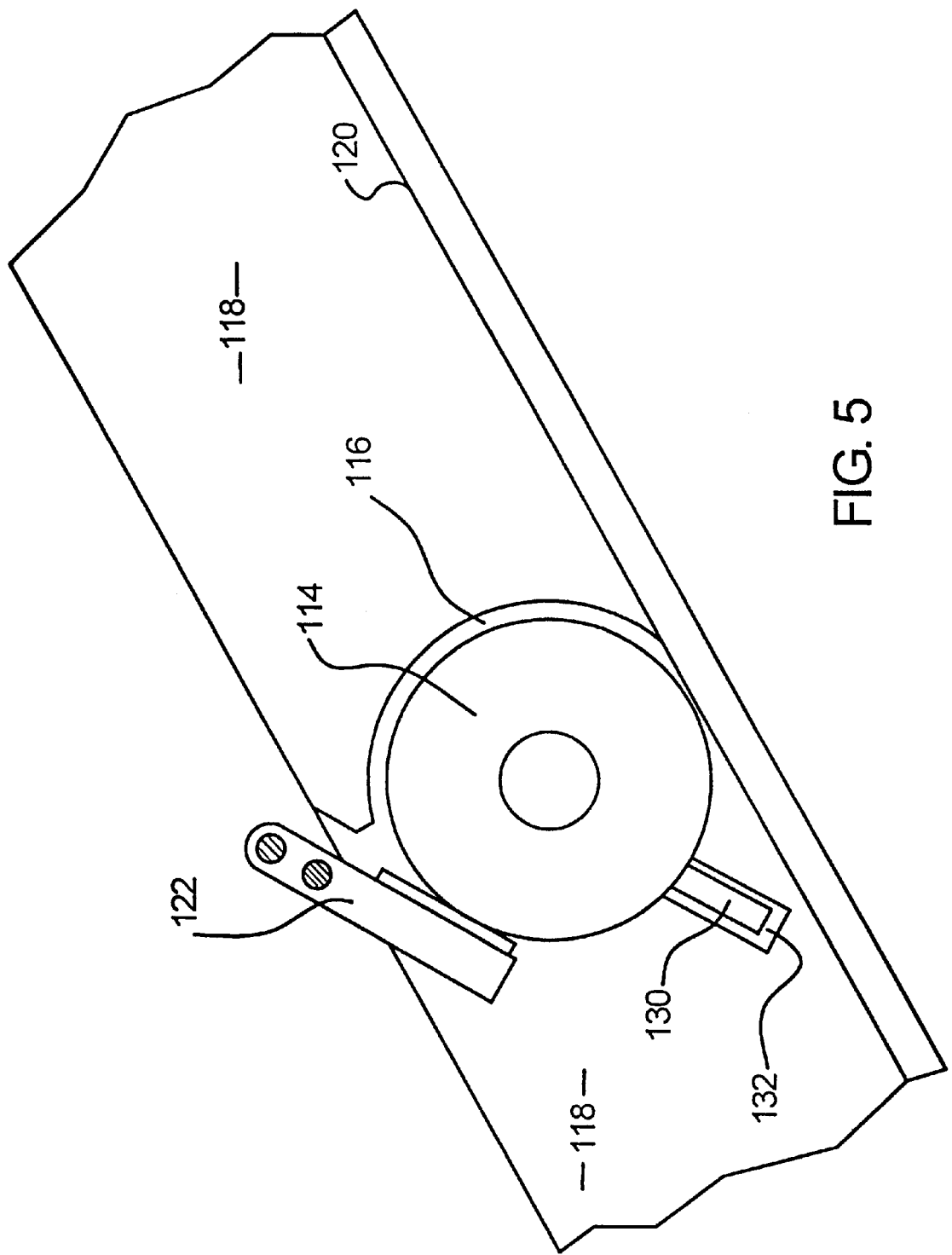
FIG. 5 is the schematic side view of FIG. 2 with a disk positioned against the stopper prior to testing.

A stop 122 is provided in fixed position relative to the trackway in order to stop, preferably through a rubber pad 124, a disk rolling down the trackway 112, as illustrated in FIG. 5. The disk testing stage 116 consists of an inset region of the trackway with a smooth surface where a disk can partially drop and then be stably inserted from the stopped position shown in FIG. 5. Positioning of the disks at the test position is critical to the performance of interferometric measurements. Therefore, as found in prior-art sample stages for disks, the inset region 116 includes three pressure tips 126 that serve as datum points for alignment of the disk being tested with the reference surface of the interferometric device (not shown in the figures of the invention). The forward position of two of the pressure tips 126 is adjustable by means of two set screws 128 rotatably threaded in the inset region of the trackway 112. Thus, the tip/tilt of the plane of the disk can be adjusted as needed for interferometric measurements.

Figure 6:
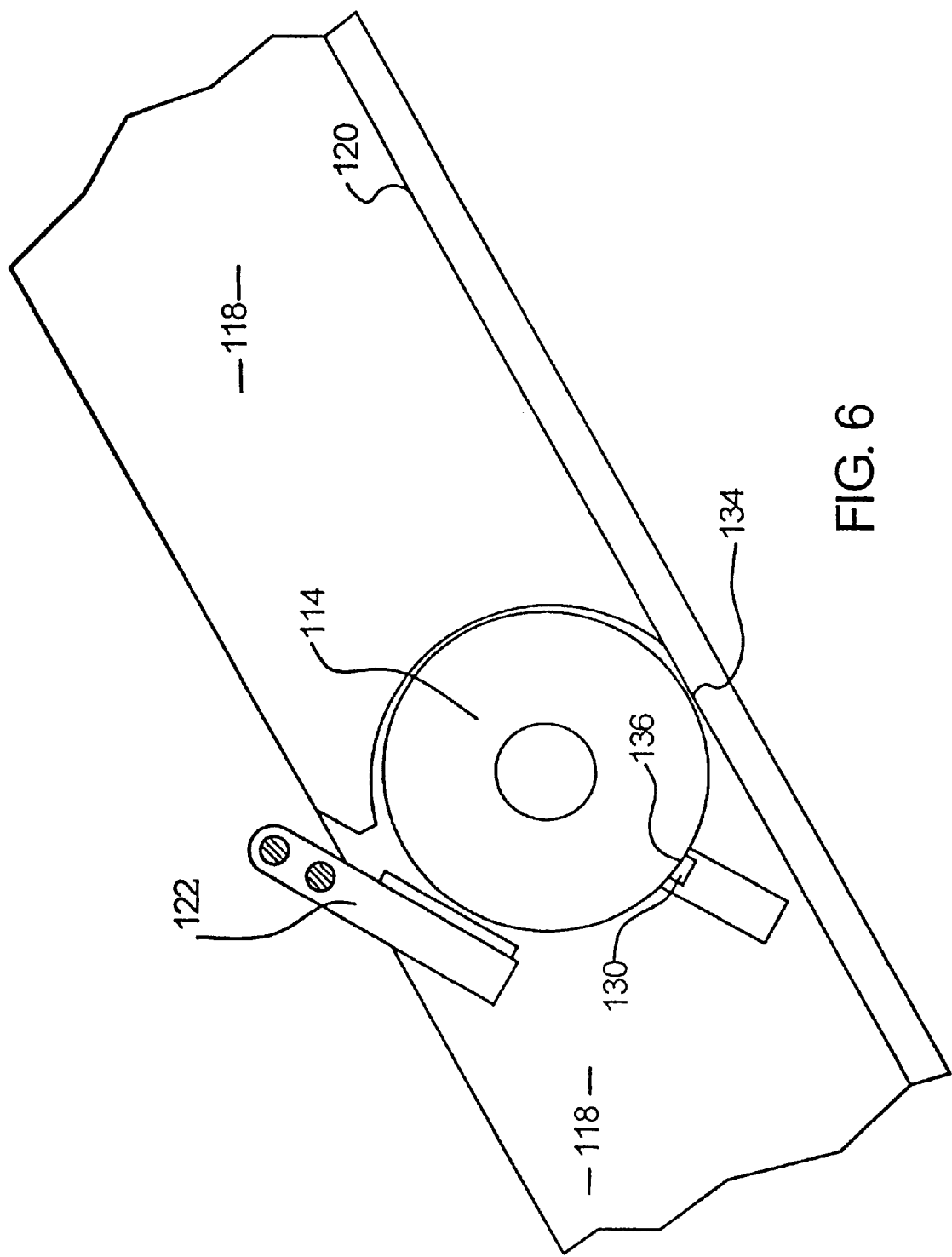
FIG. 6 is the schematic side view of FIG. 2 with a disk engaged by the retractable finger and released from the stopper prior to testing.

The invention further includes a retractable finger 130 housed in a channel 132 contained in the shoulder 118 of the device (see FIG. 3), such that the finger 130 is completely out of the way of a disk rolling down the shoulder when the finger is in retracted position as shown in FIGS. 2 and 3. The finger 130 is hinged around an axis A (FIG. 2) so that it can rotate out of the channel 132 to a position substantially perpendicular to the plane of the stage 116 and shoulder 118 and engage a disk 114 leaning against the stop 122 (FIG. 5). Upon such engagement, the disk 114 is moved backwards by the extension of the finger a small distance sufficient to release the disk from contact with the stop 122, as shown in FIG. 6. Thus, the disk remains supported vertically by its points of contact with the track 120, at point 134, and with the finger 130, at point 136, while it also leans against the stage 116 of the invention.

In order to complete the task of positioning the disk 114 for testing, it must be placed firmly against the pressure tips 126 in the stage 116. According to what is considered to be the most important feature of the invention, the disk 114 is drawn against the pressure points by a positive air stream applied to the stage region through an opening or orifice 138 (FIGS. 2 and 3) placed within a smooth surface of the stage and such that it faces a solid portion of the back surface of the disk 114. Optimally, the orifice 138 is placed such that it faces approximately the middle of the annular band constituting the back surface of a disk. The pressurized air is provided by a compressor 140 or other source through an appropriately controlled valve 142 to ensure synchronism with the delivery of a disk to the stage region and the operation of the retractable finger 130.

Figure 7:
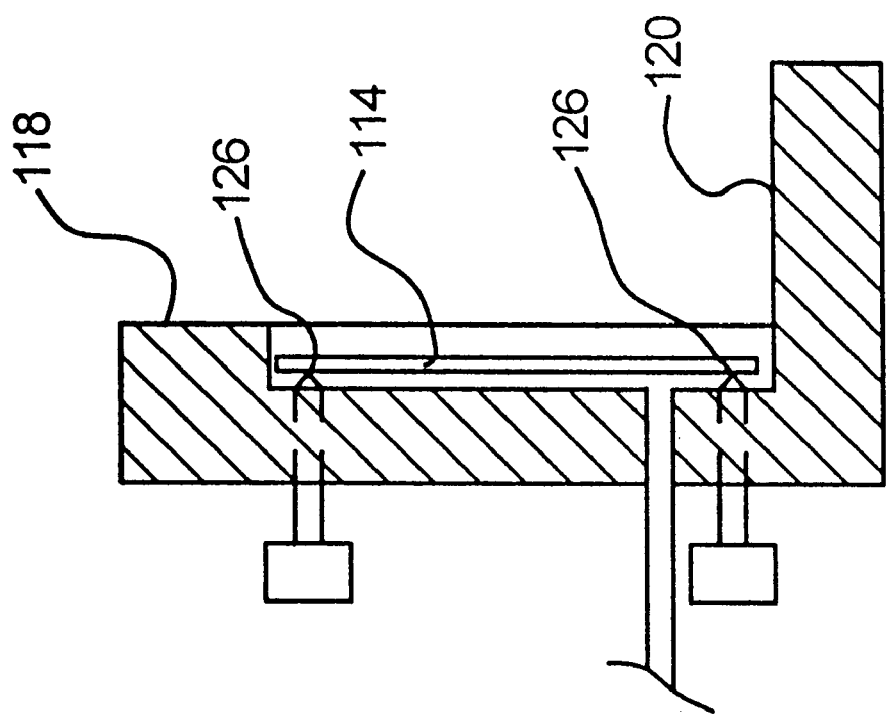
FIG. 7 is the schematic front view of FIG. 4 with a disk positioned against the pressure tips ready for testing.

It is noted that such an air gust applied to the inner surface of the disk 114 through the opening 138 will cause the disk to be drawn in toward the face of the stage region inset, rather than be pushed out, as one might superficially surmise. In fact, the acceleration experienced by the air flow out of the orifice 138 as a result of the obstruction provided by the back surface of the disk produces a local reduction in pressure that in turn causes the external ambient pressure to push the disk against the three pressure tips 126. Thus, the disk is pulled in against the tips 126, as shown in FIG. 7, so long as the air flow persists in the space provided by the tips 126 between the face of the stage region and the back surface of the disk.

Predicted by Bernoulli's equation, this phenomenon will produce an inward force so long as the air velocity out of the orifice 138 increases sufficiently to produce a corresponding pressure drop that will reduce the pressure behind the disk to a level below ambient pressure. In the preferred embodiment of the invention, pressure at about 60 psi is applied through an orifice about 3–4 mm in diameter. The pressure tips 126 extend approximately 1–2 mm from the face of the sample stage 116, and the gap between the bottom tips 126 and the bottom part of the back surface of the disk 114 is about 1–2 mm when the disk is in position for placement on the stage prior to activation of the air jet (the top portion of the disk leans against the top tip 126), as seen in FIG. 6. Based on these design parameters, the mechanism of the invention was able to process one disk approximately every four seconds.

The gap between the bottom of the disk and the surface of the stage where the orifice 138 is located is obviously critical to the Bernoulli effect required to draw the disk toward the pressure points. If the gap is too large, the pressurized air jet will blow the disk away, rather than attracting it. I found that a distance as high as 5 mm is the approximate limit to draw in a standard 95 -mm aluminum disk. It is understood that the same functional effect could be produced by the application of vacuum at the orifice 138, by it was found that a much larger orifice would be required in order to rapidly draw the disk against the pressure tips of the sample stage. Therefore, the vacuum solution is not preferred.

Figure 8:
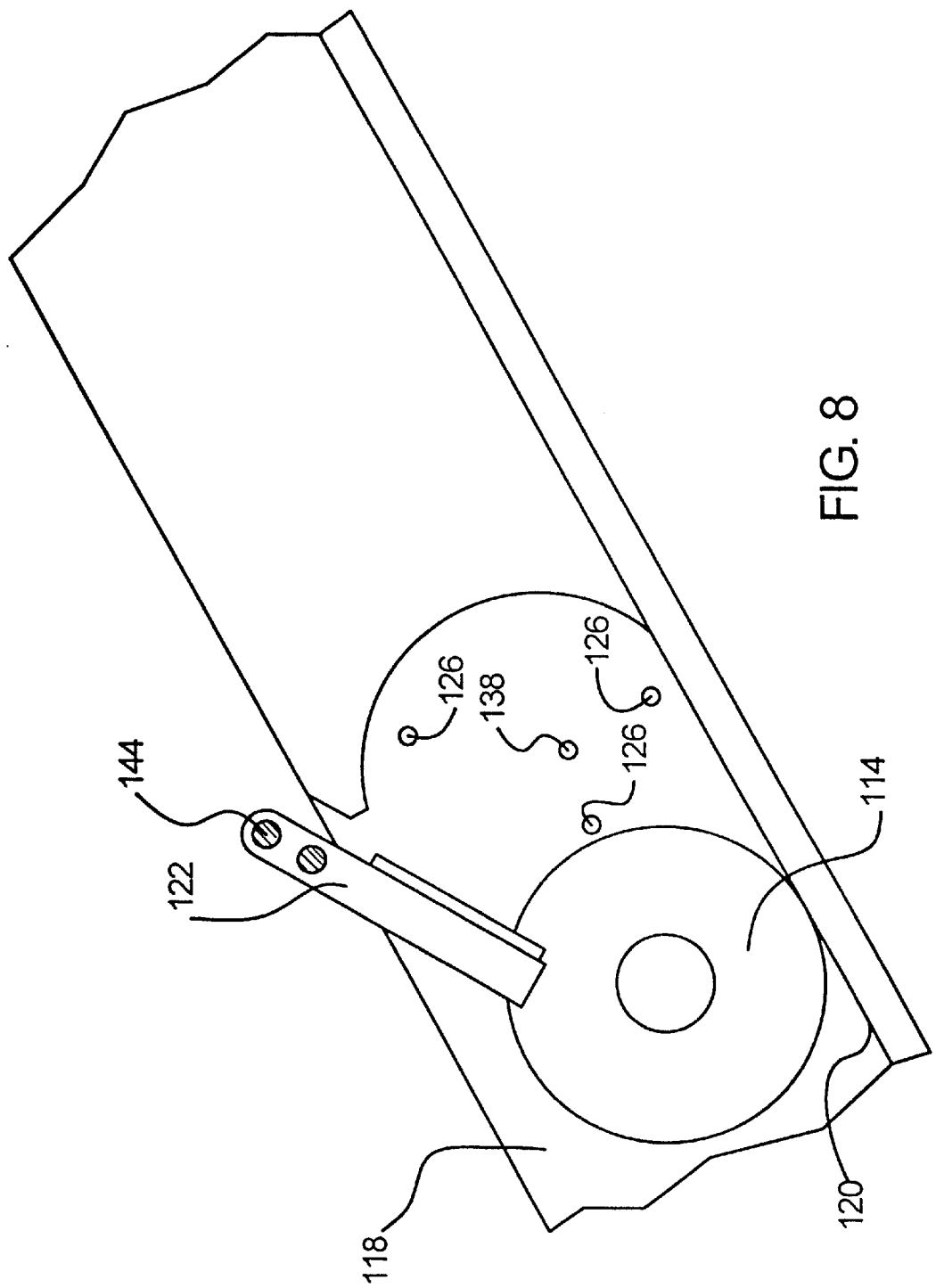
FIG. 8 is the schematic side view of FIG. 2 with a disk rolling down the trackway after testing and subsequent release by the retractable finger.

As soon as a disk 114 is placed in test position, the air flow is stopped to prevent vibrations during testing and the disk is left to rest against the three pressure tips 126 while supported by the finger 130 and track 120. The interferometric measurement is then rapidly carried out and the finger 130 is retracted into the channel 132, thereby releasing the disk 114, which by gravity is free to roll down the track 120 as illustrated in FIG. 8. It is noted that the stop 122 is mounted in such a way, such as through bolts 144 extending from a structure (not shown) opposite to the trackway 112, as to ensure the free passage of the disk down the track 120 once the disk is released by the finger 130.

Thus, the invention provides a mechanism suitable for sequential testing of a series of disks sequentially released a predetermined time intervals along the trackway 118. The three pressure points 126 are initially adjusted to achieve a "null fringe" pattern for measuring aberrations on the disk surface, according to procedures that are well understood in the art. The repeated critical positioning of each disk against the three datum points is achieved via an air blast that creates a low pressure behind the disk and draws it to the three pressure points. The air blast is quick, has no moving parts, and does not mechanically touch the disk. These are the features considered to provide material advantages over the prior art. The five-degree tilt of the shoulder 118 and, correspondingly, of the test position ensures that the disk remains stable while leaning against the pressure points 126. Thus, successively tested disks produce suitable fringe patterns so long as the relative parallelism of the front and back sides of the disk is uniform.

Figure 9:
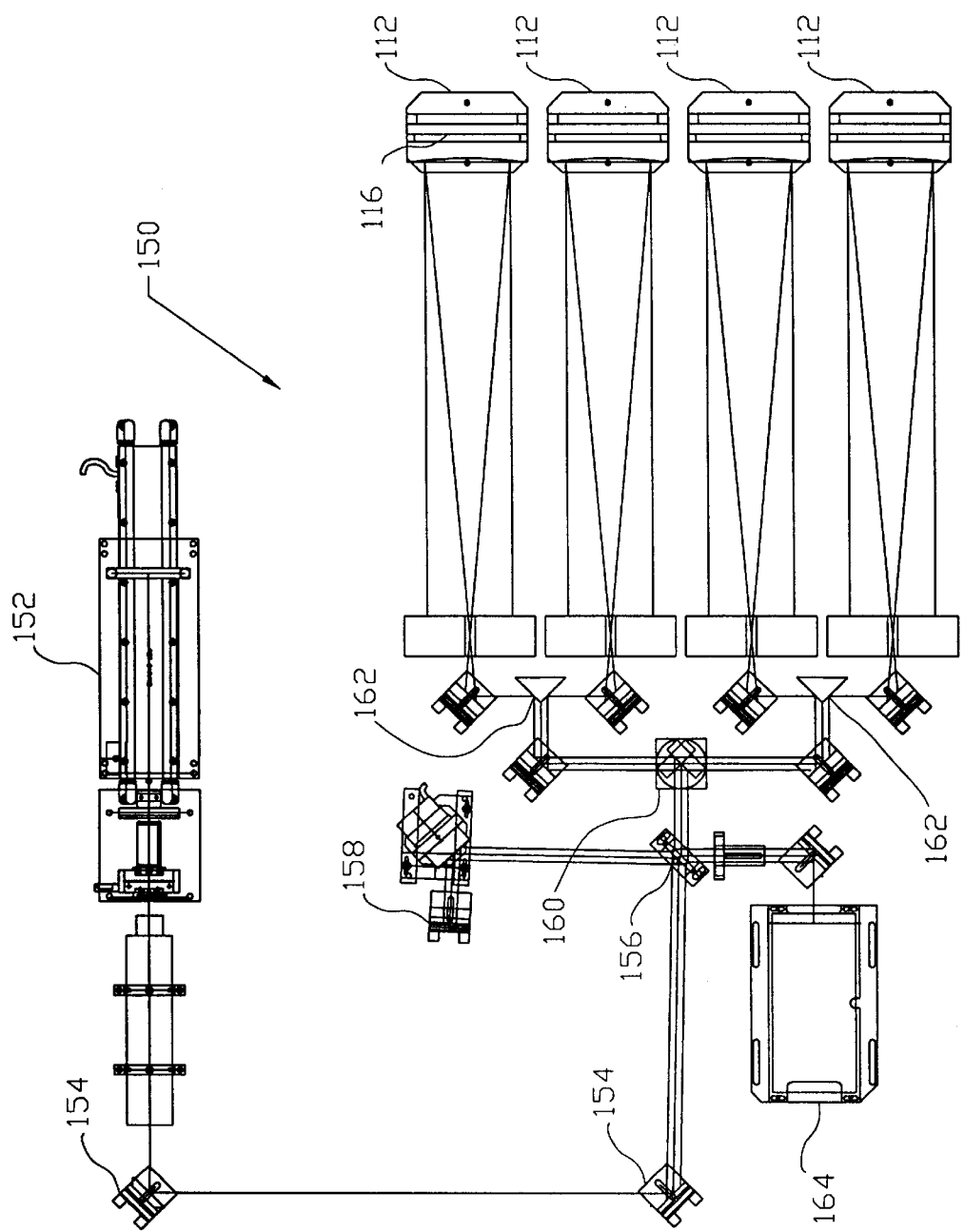
FIG. 9 is a schematic view of a four-trackway, single interferometer system for concurrently processing four streams of disks.

According to another aspect of the invention, four disk-mounting mechanisms 110 are utilized in parallel in order to process four streams of disks concurrently. The four mechanisms 110 are coupled to a single light emitting source and a single camera in a novel configuration that enables the concurrent utilization of a single interferometer with four separate disk testing stages. As illustrated in the system 150 of FIG. 9, four trackways 112 deliver disks to four separate test positions 116. As in standard equipment, a light source 152 produces a light beam that is projected, through folding mirrors 154, to a beam splitter 156, where part of the beam is reflected sideways toward a reference surface contained in interferometric apparatus 158. The portion of the beam transmitted through the splitter 156 is alternately directed to the top or bottom two test surfaces by a rotating or otherwise alternating mirror 160 adapted to operate in synchronism with the disk-mount mechanisms 112. The light reflected by the mirror 160 is further folded and then split by mirrors 162 to provide two separate beams directed to either the top or the bottom pair of test surfaces, depending on the position of the rotating mirror 160. Thus, images from the top two and bottom two tracks are paired together via split mirrors 162 and returned to the splitter 156 for combination with the light reflected by the reference surface prior to reaching the camera 164. Each of these pairs of images is alternately switched in and out of the optical path by the motion of the mirror 160. Therefore, a single light source and a single camera can be used to process concurrently disks that are mounted on four parallel mechanisms 110 of the invention. Since each is capable of processing a disk every four seconds, the system 150 can process one disk per second, thereby matching current production capacity requirements.

It is clear from the breadth of application of the concepts covered by this invention that those skilled in the art could in obvious manner include refinements that have not been addressed in this disclosure. Obvious changes could be made that are intended to be within the scope of this disclosure. For example, the invention is described with a trackway inclined 30 degrees and tilted sideways by 5 degrees, but it could be implemented in equivalent fashion with other parameters so long as suitable for producing rolling movement of the disks and their stable placement in position for testing. Also, the invention is described with reference to a Fizeau interferometer having a horizontal optical axis normal to the test surface of a disk, but the specific configuration of the invention and of the interferometer can be changed to best fit a user's need so long as the principles disclosed herein are retained. While this description focuses on computer-drive disks, the concepts of the invention are equally applicable to measurements of any test surface in a sample consisting of a structure capable of being manipulated by the use of an air stream.

Therefore, it is understood that many equivalent systems are possible within the scope of the present invention and that those skilled in the art could easily design a special system for a specific application. Thus, various changes in the details and steps that have been described may be made by those skilled in the art within the principles and scope of the invention herein illustrated and defined in the appended claims. While the present invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

I claim:

1. A mounting mechanism for an interferometric device to scan a test surface of a double-sided structure, wherein the test surface is aligned along an optical axis of the device, said mechanism comprising:

(a) three pressure tips for supporting a side of the double-sided structure such that the test surface is in optical alignment with the interferometric device;

(b) means for supporting an edge of the double-sided structure in said optical alignment with the interferometric device; and (c) pneumatic means for releasably placing said side of the double-sided structure against the three pressure tips.

2. The mechanism of claim 1, wherein said pneumatic means comprises a surface from which said three pressure tips project outwardly, and means for intermittently producing an air stream channeled between said surface and said side of the double-sided structure through an opening in the surface.

3. The mechanism of claim 2, wherein said air stream is produced by pressure applied to said opening in the surface.

4. The mechanism of claim 2, wherein said air stream is produced by vacuum applied to said opening in the surface.

5. The mechanism of claim 1, wherein said double-sided structure is a computer-drive disk.

6. The mechanism of claim 2, wherein said double-sided structure is a computer-drive disk.

7. The mechanism of claim 6, further comprising a trackway for sequentially feeding a plurality of computer-drive disks through the mechanism.

8. The mechanism of claim 7, further comprising a stop for positioning each of said disks in substantial alignment with said three pressure tips prior to activation of said pneumatic means.

9. The mechanism of claim 8, further comprising a retractable finger for releasably engaging said edge of the double-sided structure.

10. The mechanism of claim 9, wherein said air stream is produced by pressure applied to said opening in the surface.

11. The mechanism of claim 10, wherein said trackway is inclined to promote said sequential feeding of a plurality of computer-drive disks through the mechanism.

12. The mechanism of claim 11, wherein said trackway is tilted to improve retention of said disks within the trackway.

13. A mounting mechanism for an interferometric device to scan a front surface of a computer-drive disk in optical alignment therewith, comprising:

(a) an inclined trackway for feeding a disk through the mechanism, said trackway including a testing stage having a smooth surface;

(b) three pressure tips protruding from said stage for supporting a back side of the disk such that said front surface thereof is in optical alignment with the interferometric device;

(c) means for supporting an edge of the disk in said optical alignment with the interferometric device;

(d) a stop for interrupting a forward motion of the disk along said trackway and positioning the disk in substantial alignment with said three pressure tips;

(e) a retractable finger for releasably engaging said edge of the disk; and (f) means for intermittently producing an air stream channeled between said smooth surface of the stage and said back side of the disk through an opening in the smooth surface.

14. The mechanism of claim 13, wherein said air stream is produced by pressure applied to said opening in the smooth surface.

15. A method for mounting a double-sided structure on a sample stage of an interferometric device to test a surface of the double-sided structure, comprising the following steps:

(a) providing three pressure tips for supporting a side of the double-sided structure such that the test surface is in optical alignment with the interferometric device;

(b) providing means for supporting an edge of the double-sided structure in said optical alignment with the interferometric device; and (c) forcing said side of the double-sided structure against the three pressure tips by producing an air stream channeled between said surface and said side of the double-sided structure through an opening in the sample stage.

16. The method of claim 15, wherein said air stream is produced by pressure applied to said opening in the sample stage.

17. The method of claim 15, wherein said air stream is produced by vacuum applied to said opening in the sample stage.

18. The method of claim 15, wherein said double-sided structure is a computer-drive disk.

19. The method of claim 18, further comprising the step of sequentially feeding a plurality of computer-drive disks through the mechanism on an inclined trackway.

20. The method of claim 19, wherein said air stream is produced by pressure applied to said opening in the sample stage.

* * * * *